(12) United States Patent
Hu et al.

(10) Patent No.: US 6,649,259 B1
(45) Date of Patent: Nov. 18, 2003

(54) ADHESIVES FOR THERMALLY SHRINKABLE FILMS OR LABELS

(75) Inventors: Ziyi Hu, Somerville, NJ (US); Charles W. Paul, Madison, NJ (US); Peter D. Pierce, Washington Crossing, PA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/515,881

(22) Filed: Feb. 29, 2000

(51) Int. Cl.$^7$ .............. C08F 2/46; C08F 2/50
(52) U.S. Cl. ............ 428/343; 428/335 R; 428/35 SEP; 428/349; 428/347; 428/34.9; 428/35.1; 428/35.2; 428/35.5; 264/497; 264/460; 264/813; 522/100; 522/110; 522/111; 522/112; 522/104; 522/170; 522/182
(58) Field of Search .............. 428/343, 355 R, 428/355 EP, 347, 349, 34.9, 35.1, 35.2, 35.5; 522/110, 111, 112, 100, 104, 170, 182; 264/497, 460, 813, 522

(56) References Cited

U.S. PATENT DOCUMENTS

| | | | |
|---|---|---|---|
| 3,239,478 A | 3/1966 | Harlan et al. .............. 260/27 |
| 3,247,269 A | 4/1966 | Storrs et al. .............. 260/666 |
| 3,700,633 A | 10/1972 | Wald et al. .............. 260/880 |
| 3,753,936 A | 8/1973 | Marrs et al. .............. 260/27 |
| 3,765,991 A | 10/1973 | Hoffmann .............. 156/521 |
| 3,822,459 A | 7/1974 | Amberg et al. .............. 29/208 |
| 3,834,963 A | 9/1974 | Hoffmann .............. 156/215 |
| 3,932,327 A | 1/1976 | Naylor .............. 260/27 |
| 4,108,710 A | 8/1978 | Hoffmann .............. 156/450 |
| 4,699,846 A * | 10/1987 | Ohya et al. .............. 428/516 |
| 4,704,173 A | 11/1987 | Hoffman .............. 156/86 |
| 4,844,957 A | 7/1989 | Hoffman .............. 428/34.7 |
| 5,190,609 A * | 3/1993 | Lin et al. .............. 156/247 |
| 5,252,155 A * | 10/1993 | Nowicki et al. .............. 156/325 |
| 5,516,824 A | 5/1996 | Masse et al. .............. 524/270 |
| 5,544,770 A * | 8/1996 | Travisano .............. 206/807 |
| 5,639,529 A * | 6/1997 | Gozdecki et al. .............. 40/306 |
| 5,656,360 A * | 8/1997 | Faykish et al. .............. 156/60 |
| 5,665,443 A * | 9/1997 | Hata et al. .............. 428/34.9 |
| 5,747,192 A * | 5/1998 | Hughen et al. .............. 429/163 |
| 5,776,998 A * | 7/1998 | Southwick et al. .............. 522/111 |
| 5,851,615 A * | 12/1998 | Kay .............. 428/195 |
| 5,976,691 A * | 11/1999 | Noguchi et al. | |
| 6,120,882 A * | 9/2000 | Faykish et al. .............. 283/85 |
| 6,127,024 A * | 10/2000 | Weiss et al. .............. 428/204 |
| 6,181,446 B1 * | 1/2001 | Cox et al. .............. 359/1 |
| 6,229,716 B1 * | 5/2001 | Preller .............. 363/19 |
| 6,312,800 B1 * | 11/2001 | Noguchi et al. | |
| 6,372,341 B1 * | 4/2002 | Jung et al. .............. 428/354 |

FOREIGN PATENT DOCUMENTS

| | | |
|---|---|---|
| EP | 0 115 870 | 8/1984 |
| EP | 0 620 259 A2 * | 10/1994 |
| GB | 2320615 * | 6/1998 |
| JP | 08-085780 * | 4/1996 |
| WO | WO 96/11241 | 4/1996 |

OTHER PUBLICATIONS

Patent Abstracts of Japan, Publication No. 07062304, Publication Date Aug. 31, 1993, Title: 'Production of Pressure–Sensitive Adhesive Tape'.

* cited by examiner

Primary Examiner—James J. Seidleck
Assistant Examiner—Sanza L McClendon
(74) Attorney, Agent, or Firm—Cynthia L. Foulke

(57) ABSTRACT

Thermally shrinkable films or labels having coated thereon a radiation curable adhesive; and a process for applying thermally shrinkable films or labels to containers comprising the steps of a) coating at least a portion of a thermally shrinkable but unshrunken film or label segment with a radiation curable adhesive; b) applying the film or label to the longitudinal surface of the container; c) subjecting the radiation curable adhesive to a radiation source to effect curing thereof and, d) subjecting the container to heat to shrink the film or label onto the container so as to permanently affix it thereto.

17 Claims, No Drawings

ADHESIVES FOR THERMALLY SHRINKABLE FILMS OR LABELS

FIELD OF INVENTION

This invention relates to radiation curable adhesives for use with thermally-shrinkable films or labels.

BACKGROUND OF INVENTION

This invention is directed to the thermally shrinkable films or labels coated with radiation curable adhesive compositions and to a process for applying such films or labels to containers wherein they are adhered to the container surface.

There has been a trend in the packaging industry, and particularly in the beverage segment of such industry, to replace lithographically preprinted cans with blank cans which can be filled as desired. The labeling of these cans is carried out by applying to the container a printed label formed from a heat shrink film some time soon before or after the filling operation.

This method of labeling is particularly attractive, for example, to breweries which often bottle and package their products under a variety of trade names. By utilizing a thermally shrinkable labeling process, these breweries are no longer required to stock a large inventory of pre-printed containers for each brand and could, instead, stock only unprinted containers together with a supply of the appropriate thermally shrinkable printed film labels. Moreover, the presence of the film label around the container would provide additional protection against the printed containers rubbing together during transport.

Initially these labeling operations were carried out using processes and methods such as described in U.S. Pat. No. 3,822,459 issued Jul. 9, 1974, to Aveberg et al. These earlier processes required the formation of a tube or sleeve of thermally shrinkable film which was then placed over the container and heated in order to shrink the film to conform to the size and shape of the container. Recently Hoffman, in U.S. Pat. Nos. 3,765,991; 3,834,963; 4,108,710; 4,704,173; and 4,844,957, has proposed a process which does not require a preformed sleeve and permits the application of the film directly from a continuous roll of film material onto the container.

Both techniques, but especially the high speed continuous operation such as described by Hoffman, require the use of an adhesive which will form an adequate bond between the container and the label. More specifically, the bond must be such that it will not shrink and separate at the seam during the heat shrinking step. The bond should also form a smooth coating which will not bubble or cause creasing of the film during curing.

Moreover, in many applications, the containers are subjected to heating either during hot filling (e.g., fruit juice processing) or after filling as when a separate pasteurization step is required, these processes put additional stress on the adhesive bond. When used in these processes, conventional adhesives do not have adequate heat strength.

To provide the desirable properties required of an adhesive for use with thermally shrinkable films or labels, the prior art teaches the use of hot melt adhesives. Heretofore, curable adhesives for thermally shrinkable films or labels has not been considered.

SUMMARY OF INVENTION

We have found that radiation curable adhesive compositions permit satisfactory application of thermally shrinkable films or labels onto containers even at the high speeds involved in continuous processes and where such radiation curable adhesive composition gains instant high heat resistance after curing. The resultant bond is strong, and retains its configuration even after the heat shrinking operation and any additional pasteurization operations so that the "shoulder seams" formed at the ends of the container as well as the seam joint formed at the interface of the leading and trailing edge of the film remain in the desired configuration with no distortion of the label or undesirable exposure of the container at the seam lap.

Thus, the present invention is directed to thermally shrinkable films or labels having coated thereon a radiation curable adhesive and to a process for applying thermally shrinkable films or labels to containers comprising the steps of a) coating at least a portion of a thermally shrinkable but unshrunken film or label segment with a radiation curable adhesive; b) applying the film or label to the longitudinal surface of the container; c) subjecting the radiation curable adhesive to a radiation source to effect curing thereof and, d) subjecting the container to heat to shrink the film or label onto the container so as to permanently affix it thereto.

With some adhesive compositions it is possible, and may be desirable, to reverse steps b) and c). Such adhesives undergo initiation and partial polymerization under UV light, but continue and eventually complete their cure after removal from the UV light source. These adhesives complete their cure some time after exposure in what is commonly known as the dark-cure process. Cationic curing systems typically exhibit dark cure behavior, whereas free-radical curing systems typically do not.

In a preferred embodiment, the radiation curable adhesive is applied to a narrow region of the container or at the leading end of the film segment to secure the leading end of the film to the container, the film wrapped around the container and the film segment secured to the container by overlapping the trailing end, a narrow region of which has been coated with the radiation curable adhesive.

Also disclosed herein are shrink labeled containers wherein the labels are affixed to the container utilizing radiation curable adhesive having an epoxidized block copolymer or a cycloaliphatic epoxide as the base resin. The term "solid hydrogenated tackifier" as used herein, is intended to mean any composition which is solid at room temperature and which is useful to impart tack to the radiation curable adhesive composition. ASTM D-1878-61T defines tack as "the property of a material which enables it to form a bond of measurable strength immediately on contact with another surface".

The term "base resin" as used herein is intended to mean a polymer which undergoes curing upon UV exposure. Radiation curable adhesives as used herein is intended to mean adhesives that generally comprise one or more of the following:

(a) a base resin, such as epoxidized block copolymer (as described in U.S. Pat. No. 5,516,824 and U.S. Pat. No. 5,776,998); and/or a cycloaliphatic epoxy (such as CYRACURE UVI6110 available from UNION CARBIDE); an olefin (including that having a Carbon-Carbon double bond pendant to the backbone or on ends—such materials may be oligomeric, polymeric or monomeric and the backbone may vary in polarity ranging from aliphatic, urethane, polyester and polyether);

(b) a photoinitiator, the type of which is dependent on the type of chemistry of the base resin e.g. cationic photoinitiator suitable for curing epoxidized block copolymer, cycloaliphatic epoxies, and vinyl ether olefins which includes sulfonium or iodonium salts such as SARCAT CD1010, SARCAT CD 1011 AND SARCAT CD 1012 (available from SARTOMER) (note: SARCAT CD1010 is also available under the trade name CYRACURE UVI 6974 from UNION CARBIDE). For free-radical curing systems such as olefinic or thiolene curing systems the following photoinitiators may be suitable: IRGACURE 651, 184 and 1700 and DAROCUR 1173, available from CIBA-GEIGY; as well as GENOCURE LBP available from RAHN; and ESACURE KIP150 available from SARTOMER. Other examples of photoinitiators which may be used include one or more of the following: Benzophenone, Benzyldimethyl ketal, Isopropylthioxanthone, bis(2,6-dimethoxybenzoyl)(2,4,4-trimethylpentyl) phosphineoxide, 2-hydroxy-2-methyl-1-phenyl-1-propanone, Diphenyl(2,4,6-trimethybenzoyl) phosphine oxides, 1-hydroxycyclohexyl phenyl ketone, 2-benzyl-2-(dimethylamino)-1-4-(4-morpholinyl) phenyl-1-butanone, alpha,alpha.-dimethoxy-alpha-phenylacetophenone, 2,2-diethoxyacetophenone, 2-methyl-1-4-(methylthio)phenyl-2-(4-morpholinyl)-1-propanone, 2-hydroxy-1-4-(hydroxyethoxy)phenyl-2-methyl-1-propanone;

(c) a tackifier, such as the $C_5/C_9$ hydrocarbon resins, synthetic polyterpenes, rosin, rosin esters, natural terpenes, and the like. More particularly, the useful tackifying resins include any compatible resins or mixtures thereof such as natural and modified rosins including gum rosin, wood rosin, tall oil rosin, distilled rosin, hydrogenated rosin, dimerized rosin, and polymerized rosin; glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natural terpenes, such as styrene/terpene and alpha methyl styrene/terpene; polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; phenolic modified terpene resins and hydrogenated derivatives thereof such, for example, as the resin product resulting from the condensation, in an acidic medium, of a bicyclic terpene and a phenol; aliphatic petroleum hydrocarbon resins resulting from the polymerization of monomers consisting primarily of olefins and diolefins; hydrogenated aliphatic petroleum hydrocarbon resins; and cyclic petroleum hydrocarbon resins and the hydrogenated derivatives thereof; also included are the cyclic or acyclic $C_5$ resins and aromatic modified acyclic or cyclic resins. Mixtures of two or more of the above described tackifying resins may be required;

(d) a diluent, such as a plasticizing or extending oil including olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000;

(e) a wax, such as a petroleum derived paraffinic or mycrocrystalline wax (including PACEMAKER 53 available from CITGO) is useful for altering the viscosity, green-strength, reducing tack of the final composition;

(f) a compatible polymer such as a block copolymer including polystyrene-polybutadiene-polystyrene, polystyrene-polyisoprene-polystyrene, poly(alpha-methyl-styrene)-polybutadiene-poly(alpha-methyl-styrene), poly(alpha-methyl-styrene)-polyisoprene-poly(alpha-methyl-styrene), as well as the hydrogenated modifications thereof, e.g. polystyrene-poly(ethylene-butylene)-polystyrene. These copolymers may be prepared by methods taught, for example, in U.S. Pat. Nos. 3,239,478; 3,247,269; 3,700,633; 3,753,936; and 3,932,327. For higher polarity systems, polymers such as polyesters (e.g. DYNAPOL materials available from HULS and sulfonated polyesters (available from EASTMAN under the title AQ series) and acrylic polymers (such as ACRONAL AC205 and ACRONAL AC 258 available from BASF) which are also reactive with free-radical systems and non-reactive acrylics (such as those available from SCHENECTADY CHEMICAL). Other, non-limiting examples of additional materials include the following: SBR random copolymers with low (<20%) or high (>20%) vinyl contents, available under the tradename DURADENE from FIRESTONE (these high vinyl copolymers are reactive and contribute to the crosslinking of the system); EPDM copolymers which can react into the polymer network via unsaturated sites, and saturated analogs (e.g. EP rubber) that can modify the peel and tack of the adhesive. These are available from EXXON under the trade name VISTALON; butyl rubber, which is a copolymer of isoprene and isobutylene and is available from EXXON CHEMICAL COMPANY under the trade name SB BUTYL; polyisobutylene, available from EXXON CHEMICAL COMPANY under the trade name VISTANEX; and liquid polyisopropylene such as is available from KURARAY INC. under the trade name LIR;

(g) an alcohol-containing co-reactant for cationic-curing systems which is often added to adjust crosslink density, Tg, viscosity, and specific adhesion. Examples include, polyesterpolyols available from STEPAN CHEMICAL COMPANY and from UNION CARBIDE; polyalkylene oxide polyols such as PEG and PPG available from UNION CARBIDE; aliphatic diols such as L-2203 available from SHELL (this is an ethylene butylene diol); and L-1203 an ethylene butylene mono-ol available from SHELL; also useful are polybutadiene polyols available from ATOCHEM; epoxidized polybutadiene polyols for alcohols may also be used; and (h) other additives known to those skilled in the art. These additives may include, but are not limited to, pigments, fillers, fluorescent additives, flow and leveling additives, wetting agents, surfactants, antifoaming agents, rheology modifiers, stabilizers, and antioxidants. Preferred additives are those which do not have appreciable absorption in the wavelengths of interest.

DESCRIPTION OF THE PREFERRED EMBODIMENTS

It is an object of the present invention to provide thermally shrinkable films or labels having coated thereon a radiation curable adhesive.

It is a further object of the present invention to provide a process for applying thermally shrinkable films or labels to containers comprising the steps of a) coating at least a portion of a thermally shrinkable but unshrunken film or label segment with a radiation curable adhesive; b) applying the label or film to the longitudinal surface of the container; c) subjecting the radiation curable adhesive to a radiation source to effect curing thereof; and c) subjecting the container to heat to shrink the film or label onto the container so as to permanently affix it thereto.

Preferred radiation curable adhesives of the present invention have a viscosity at the application temperature of less than about 2,000 cps, more preferably less than about 1,000 cps.

Preferred radiation curable adhesives of the present invention are cationically curable systems, preferably based on epoxidized block copolymers or cycloaliphatic epoxides (with an epoxy functionality greater than 1, preferably 2). The most preferred epoxidized block copolymer base is L-207. The most preferred cycloaliphatic epoxides are CYRACURE UVR-6110 and CYRACURE UVR-6105 (each of these has a functionality of 2).

The preferred epoxidized block copolymer radiation curable adhesive composition of the present invention comprises:
(a) from about 5 percent by weight to about 60 percent by weight of at least one epoxidized block copolymer;
(b) from about 20 percent by weight to about 85 percent by weight of at least one solid-hydrogenated tackifier;
(c) about 0.02 percent by weight to about 5 percent by weight of at least one cationic photoinitiator;
(d) about 0 percent by weight to about 40 percent by weight of at least one mineral oil;
(e) about 0 percent by weight to about 40 percent by weight of at least one liquid tackifier; and
(f) about 0 percent by weight to about 3 percent by weight of an antioxidant.

The even more preferred epoxidized block copolymer radiation curable adhesive composition of the present invention comprises:
(a) from about 20 percent by weight to about 40 percent by weight of at least one epoxidized block copolymer;
(b) from about 50 percent by weight to about 70 percent by weight of at least one solid-hydrogenated tackifier;
(c) about 0.2 percent by weight to about 2 percent by weight of at least one cationic photoinitiator;
(d) about 0 percent by weight to about 25 percent by weight of at least one mineral oil; and
(e) about 0 percent by weight to about 1.5 percent by weight of at least one hindered phenol antioxidant.

The preferred cycloaliphatic epoxide radiation curable adhesive composition of the present invention comprises:
(a) from about 10% by weight to about 50% by weight of at least one epoxidized cycloaliphtic base resin;
(b) from about 0.1% by weight to about 2.0% by weight of at least one cationic photoinitiator;
(c) from about 0% by weight to about 80% by weight of at least one solid or liquid polyester diol; and
(d) from about 0% by weight to about 60% by weight of at least one polar tackifier.

The even more preferred cycloaliphatic epoxide radiation curable adhesive composition of the present invention comprises:
(a) from about 20% by weight to about 30% by weight of at least one epoxidized cycloaliphatic base resin;
(b) from about 1.0% by weight to about 2.0% by weight of at least one cationic photoinitiator;
(c) from about 60% by weight to about 80% by weight of at least one solid or liquid polyester diol; and
(d) from about 0% by weight to about 10% by weight of at least one polar tackifier.

Tackifiers are chosen to impart substantial adhesive strength, promote substrate wetting and generally enhance adhesive performance, i.e. to optimize tack performance versus temperature performance of the composition. Tackifiers may comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the radiation curable adhesives of this invention. Examples include, but are not limited to, rosin itself, hydrogenated rosin, dehydrogenated rosin, dimerized and polymerized rosin, and the esters of rosin and the modified rosins with alcohols and polyols such as methanol, ethylene glycol, di- and triethylene glycols, glycerol, or pentaerythritol, and the like. Many such materials are commercially available under a wide variety of trade names. An example of a commercially available solid hydrogenated tackifiers useful in this invention is Escorez 5400 sold by Exxon.

Radiation curable adhesive compositions of the invention acquire their adhesive characteristics upon exposure to a radiant energy source such as electron beam or ultraviolet light (UV). For industrial use, medium pressure mercury vapor lamps (with or without electrodes) are commonly used to cure the composition. In the case of UV curing, one or more photoinitiators and/or photosensitizers are added to the composition prior to exposure to the radiant energy source. Insuring that the emission of the light source corresponds with the absorption of the photoinitiator is critical. The photoinitiators are typically employed in concentrations ranging from about 0.02% by weight to about 5% by weight. The concentration is chosen based on the thickness of the application of the uncured radiation curable composition. Commercial examples include the cationic photoinitiator CYRACURE UVI 6974 available from UNION CARBIDE.

Examples of free-radical photoinitiators which may be used include one or more of the following: Benzophenone; Benzyldimethyl ketal; Isopropylthioxanthone; bis(2,6-dimethoxybenzoyl)(2,4,4-trimethyl-pentyl)phosphineoxide; 2-hydroxy-2-methyl-1-phenyl-1-propanone; Diphenyl(2,4,6-trimethybenzoyl)phosphine oxides; 1-hydroxycyclohexyl phenyl ketone; 2-benzyl-2-(dimethylamino)-1-)4-(4-morpholinyl)phenyl-1-butanone; alpha,alpha.-dimethoxy-alpha-phenylacetophenone; 2,2-diethoxyacetophenone; 2-methyl-1-)4-(methylthio)phenyl-2-(4-morpholinyl)-1-propanone; 2-hydroxy-1-4-(hydroxyethoxy)phenyl-2-methyl-1-propanone.

Combinations of photoinitiators may be used to achieve the best possible cure of adhesive compositions. Photoinitiators are preferably used in the least amount necessary to initiate cure at the line speed of the process.

Examples of optional mineral oils which may be used include refined hydrocarbon oils typically present in adhesives, including paraffinic, aromatic, and naphthenic oils available under the trade designations KAYDOL (produced by WITCO), TUFFLO (produced by ARCO), and the like. The refined oils serve as a diluent and improve surface tack properties. Non-aromatic oils are preferred as these absorb less UV light.

Liquid tackifying resins useful herein include aliphatic and cycloaliphatic hydrocarbons and modified hydrocarbons and hydrogenated derivatives and terpenes and hydrogenated derivatives. These liquid tackifying resins have softening points of less than about 70° C., preferably less than about 50° C. and most preferably less than about 30° C.

Examples of useful liquid tackifying resins include but are not limited to REGALITE R-10, a $C_5$ liquid tackifier with a softening point of 10° C. available from HERCULES, and WINGTACK 10, a liquid hydrocarbon resin with a softening point of 10° C. available from GOODYEAR CHEMICAL CO.

Antioxidants or stabilizers are typically added to the commercially available compounds in order to protect the ingredients against degradation during preparation and use of the adhesive compositions, however without interfering with radiation curing. Combinations of antioxidants are often more effective due to the different mechanisms of degradation to which various adhesives are subject. Certain hindered phenols, organo-metallic compounds, aromatic amines, aromatic phosphites, and sulfur compounds are useful for this purpose. Examples of effective types of these materials include phenolic antioxidants, thio compounds, and tris-(nonylated phenyl) phosphites.

Examples of commercially available antioxidants are IRGANOX 1010 (pentaetythrityl-tetrakis[3-(3,5-di-tertbutyl-4-hydroxyphenyl)propionate; IONOL (2,6-di-tertiary-butyl-4-methyl phenol); IONOX 330 (3,4,6-tris (3,5-di-tertiary-butyl-p-hydroxybenzyl)-1,3,5-trimethylbenzene); and POLYGARD HR (tris-(2,4-di-tertiary-butyl-phenyl) phosphite).

The adhesive composition may further contain relatively minor amounts of ingredients, such as fillers, coupling agents, colorants, and other additives which do not substantially adversely affect the system, such as, for example, by adversely interfering with adhesion to a substrate surface.

The radiation curable adhesive compositions of the present invention are typically prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory.

The radiation curable adhesive is then used to affix the thermally shrinkable labels to the appropriate containers using conventional packaging equipment, especially that described in U.S. Pat. Nos. 4,704,173 and 4,844,957. The technique is particularly useful in the labeling of glass, metal or plastic cylindrical or multi-faceted containers using thermally shrinkable labels made from polyolefins such as polypropylene or polyethylene or from polyvinyl chloride films or similar plastic sheets such as foamed polyethylene, polypropylene or polystyrene.

Typical, but non-limiting, process parameters may include:

(a) applying radiation curable adhesive to thermally shrinkable film, preferably to a UV transparent edge section of the film that is non-inked and transmits at least 50% of supplied UV light;

(b) using a labeling speed of greater than about 40 containers per minute at an application temperature that is dependent on the type of film or label, and type and amount of radiation curable adhesive, but typically from about 75° F. to about 300° F.;

(c) radiation curable adhesive may be applied from either a patterned or a smooth role at a thickness of about 0.1 to about 1.0 mil;

(d) radiation curable adhesive may be irradiated either before wrapping or, preferably, after wrapping. Irradiation is preferably carried out at a low dose (i.e. about 400 mJ/cm$^2$ and most preferably at less than about 200 mJ/cm$^2$ UVB dose from a Fusion H bulb) as low dose is beneficial to avoid any shrinkage of the label during irradiation and to maximize line speed);

(e) choice of UV lamps is generally dependent on the type of photoinitiator. For practical reasons it is preferred to use two or less lamps of the standard Hg UV type with a power of about 600 W per inch;

(f) wrapped and irradiated containers may then be passed through a heat-shrink tunnel.

In general, it is preferred that the labels shrink uniformly around the container and not slip at the seam. In addition the final container should be able to withstand heat or cold without delamination or seam slippage.

The radiation curable adhesives according to this invention may also be cured effectively beneath a transparent section of a non-thermally shrinkable film or label.

This invention can be further illustrated by the following examples of preferred embodiments thereof although it will be understood that these examples are included merely for purposes of illustration and are not intended to limit the scope of the invention unless otherwise specifically indicated.

EXAMPLES

Viscosity measurements were made using a Brookfield viscometer.

| | EXAMPLE 1 (% by wt.) | EXAMPLE 2 (% by wt.) | EXAMPLE 3 (% by wt.) | EXAMPLE 4 (% by wt.) |
|---|---|---|---|---|
| CYRACURE UVR-6110 | 25 | 24 | 25 | 25 |
| CYRACURE UVI 6974 | 2 | 1.8 | 1.8 | 2.0 |
| TONE POLYOL 0305 | 5 | 5 | 5 | 5 |
| Poly BD 605E | 4 | 0 | 0 | 0 |
| STEPANPOL PH-56 | 64 | 0 | 33.2 | 0 |
| NIREZ V-2040 | 0 | 0 | 33.2 | 3 |
| SYLVATAC XR-4136 | 0 | 5 | 5 | 0 |
| STEPANPOL PN-110 | 0 | 35 | 0 | 65 |
| STEPANPOL PD-56 | 0 | 30 | 0 | 0 |
| VISCOSITY (CPS) | 665 @ 160° F. | 582 @ 190° F. | 620 @ 200° F. | 785 @ 190° F. |
| Wrapped label cured with 2 × 600 watt Mercury UV lamps at 150 ft/min, followed by passing through a hot air tunnel for label shrinkage | Adhesive fully cured, No seam slippage | Adhesive fully cured No seam slippage | Adhesive fully cured, No seam slippage. | Less than 1 mm seam slippage. |

| | EXAMPLE 5 (% by wt.) | EXAMPLE 6 (% by wt.) | EXAMPLE 7 (% by wt.) | EXAMPLE 8 (% by wt.) |
|---|---|---|---|---|
| L-207 | 30 | 28.5 | 25 | 25 |
| CYRACURE UVI 6974 | 1 | 1.5 | 1 | 0 |
| KAYDOL | 19 | 10 | 24 | 25 |
| ESCOREZ 5400 | 50 | 60 | 50 | 50 |
| IRGANOX 1010 | 0.1 | 0.1 | 0.1 | 0.1 |
| SARCAT CD1012 | 0 | 0 | 0 | 0.2 |
| VISCOSITY (CPS) | 672 @ 210° F. | 754 @ 240° F. | 585 @ 210° F. | 630 @ 205° F. |
| Wrapped label cured with 2 × 600 watt Mercury UV lamps at 150 ft/min, followed by passing through a hot air tunnel for label shrinkage | Adhesive fully cured, No seam slippage | Adhesive fully cured No seam slippage | seam slippage less than 1 mm. | Adhesive fully cured, No seam slippage. |

In the examples, the commercial components are identified as follows:

CYRACURE UVR-6110 is a UV curable cycloaliphatic epoxide available from UNION CARBIDE.

CYRACURE UVI 6974 is cationic photoinitiator available from UNION CARBIDE.

TONE POLYOL 0305 is a polyester polyol available from UNION CARBIDE.

STEPANPOL PH-56 is a polyester diol available from STEPAN.

STEPANPOL PN-110 is a polyester diol available from STEPAN.

STEPANPOL PD-200 is a polyester diol available from STEPAN.

STEPANPOL PD-110 LV is a polyester diol available from STEPAN.

STEPANPOL PD-56 is a polyester diol available from STEPAN.

PLASTHALL BH-1 is a polyester diol available from C.P HALL.

SYLVATAC XR-4136 is a wood rosin available from ARIZONA CHEMICAL.

NIREZ V-2040 is a terpene tackifier available from ARIZONA CHEMICAL.

POLY BD 605E is a epoxidized polybutadiene available from ELF ATOCHEM.

L-207 is a hetero-telechelic polymer consisting of a primary hydroxyl functionality on one end of the polymer and epoxidized isoprene functionality on the other end. It has a hydroxyl equivalent weight of 6,600 and an epoxy equivalent weight of 590 and is available from SHELL CHEMICAL COMPANY.

ESCOREZ 5400 is a hydrogenated DCPD (dicyclopentadiene) resin having a softening point of 100 ° C. and is available from EXXON.

KAYDOL is a naphthenic mineral oil and is available from WITCO.

REGALITE R-10 is a Cs liquid tackifier with a softening point of 10 ° C. and is available from HERCULES.

SARCAT CD1012 is a diaryl iodonium hexafluoroantimonate used as a cationic photoinitiator and is available from SARTOMER.

CYRACURE UVI6974 is a tri-aryl hexfluoro antimonate cationic photoinitiator and is available from UNION CARBIDE.

IRGANOX 1010 is a hindered phenol anti-oxidant available from CIBA-GEIGY.

All of the above examples show the superior adhesion, heat and shrink resistant properties of the adhesives described herein.

We claim:

1. A thermally shrinkable film or label having coated thereon a radiation curable adhesive composition comprising an epoxidized block copolymer and/or a cycloaliphatic epoxide, said adhesive composition having a viscosity at its application temperature of less than about 2,000 cps.

2. The thermally shrinkable film or label according to claim 1 wherein the radiation curable adhesive is coated beneath a transparent section of the thermally shrinkable film or label.

3. The thermally shrinkable film or label according to claim 1 wherein the radiation curable adhesive has a viscosity at its application temperature of less than about 1,000 cps.

4. The thermally shrinkable film or label according to claim 1 wherein the radiation curable adhesive composition comprises:

(a) from about 5 percent by weight to about 60 percent by weight of at least one epoxidized block copolymer;

(b) from about 20 percent by weight to about 85 percent by weight of at least one solid-hydrogenated tackifier;

(c) about 0.02 percent by weight to about 5 percent by weight of at least one cationic photoinitiator;

(d) about 0 percent by weight to about 40 percent by weight of at least one mineral oil;

(e) about 0 percent by weight to about 40 percent by weight of at least one liquid tackifier, and (f) about 0 percent by weight to about 3 percent by weight of an antioxidant.

5. The thermally shrinkable film or lable according to claim 1 wherein the radiation curable adhesive composition comprises:

(a) from about 20 percent by weight to about 40 percent by weight of at least one epoxidized block copolymer;

(b) from about 50 percent by weight to about 70 percent by weight of at least one solid-hydrogenated tackifier;

(c) about 0.2 percent by weight to about 2 percent by weight of at least one cationic photoinitiator;

(d) about 0 percent by weight to about 25 percent by weight of at least one mineral oil; and (e) about 0 percent by weight to about 1.5 percent by weight of at least one hindered phenol antioxidant.

6. The thermally shrinkable film or label according to claim 1 wherein the radiation curable adhesive composition comprises:

(a) from about 10% by weight to about 50% by weight of at least one epoxidized cycloaliphatic base resin;

(b) from about 0.1% by weight to about 2.0% by weight of at least one cationic photoinitiator;

(c) from about 0% by weight to about 80% by weight of at least one solid or liquid polyester diol; and (d) from about 0% by weight to about 60% by weight of at least one polar tackifier.

7. The thermally shrinkable film or label according to claim 1 wherein the radiation curable adhesive comprises:

(a) from about 20% by weight to about 30% by weight of at least one epoxidized cycloaliphatic base resin;

(b) from about 1.0% by weight to about 2.0% by weight of at least one cationic photoinitiator;

(c) from about 60% by weight to about 80% by weight of at least one solid or liquid polyester diol; and (d) from about 0% by weight to about 100/by weight of at least one polar tackifier.

8. A process for applying a thermally shrinkable film or label to a container comprising the steps of:

(a) coating a radiation curable adhesive on at least a portion of a thermally shrinkable but unshrunken film or label segment;

(b) applying the film or label to the longitudinal surface of the container;

(c) subjecting the radiation curable adhesive to a radiation source to effect curing thereof; and (d) subjecting the container to heat to shrink the film or label onto the container so as to permanently affix it thereto.

9. The process according to claim 8, wherein the radiation curable adhesive has a viscosity at its application temperature of less than about 2,000 cps.

10. The process according to claim 8, wherein the radiation curable adhesive has a viscosity at its application temperature of less than about 1,000 cps.

11. The process according to claim 8 wherein the radiation curable adhesive comprises:

(a) from about 5 percent by weight to about 60 percent by weight of at least one epoxidized block copolymer;

(b) from about 20 percent by weight to about 85 percent by weight of at least one solid-hydrogenated tackifier;

(c) about 0.02 percent by weight to about 5 percent by weight of at least one cationic photoinitiator;

(d) about 0 percent by weight to about 40 percent by weight of at least one mineral oil;

(e) about 0 percent by weight to about 40 percent by weight of at least one liquid tackifier; and (f) about 0 percent by weight to about 3 percent by weight of an antioxidant.

12. The process according to claim 8 wherein the radiation curable adhesive composition comprises:

(a) from about 20 percent by weight to about 40 percent by weight of at least one epoxidized block copolymer;

(b) from about 50 percent by weight to about 70 percent by weight of at least one solid-hydrogenated tackifier;

(c) about 0.2 percent by weight to about 2 percent by weight of at least one cationic photoinitiator;

(d) about 0 percent by weight to about 25 percent by weight of at least one mineral oil; and (e) about 0 percent by weight to about 1.5 percent by weight of at least one hindered phenol antioxidant.

13. The process according to claim 8 wherein the radiation curable adhesive composition comprises:

(a) from about 10% by weight to about 50% by weight of at least one epoxidized cycloaliphatic base resin;

(b) from about 0.1% by weight to about 2.0% by weight of at least one cationic photoinitiator;

(c) from about 0% by weight to about 80% by weight of at least one solid or liquid polyester diol; and (d) from about 0% by weight to about 60% by weight of at least one polar tackifier.

14. The process according to claim 8 wherein the radiation curable adhesive composition comprises:

(a) from about 20% by weight to about 30% by weight of at least one epoxidized cycloaliphatic base resin;

(b) from about 1.0% by weight to about 2.0% by weight of at least one cationic photoinitiator;

(c) from about 60% by weight to about 80% by weight of at least one solid or liquid polyester diol; and (d) from about 0% by weight to about 10% by weight of at least one polar tackifier.

15. The process according to claim 8 wherein the radiation curable adhesive is applied to a narrow longitudinal region of the container or of the leading end of the film segment to secure the leading end of the film to the container, the film wrapped around the container and the film segment secured to the container by overlapping the trailing end, a narrow region of which has been coated with the radiation curable adhesive.

16. The process of claim 8 wherein the adhesive is coated at a leading end and/or a trailing end of said film or label.

17. The process of claim 16 wherein the film or label is applied to the surface of the container by securing the leading end of the film or label to said surface and wrapping the film or label around to container such that the trailing end overlaps the leading end.

* * * * *